UNITED STATES PATENT OFFICE.

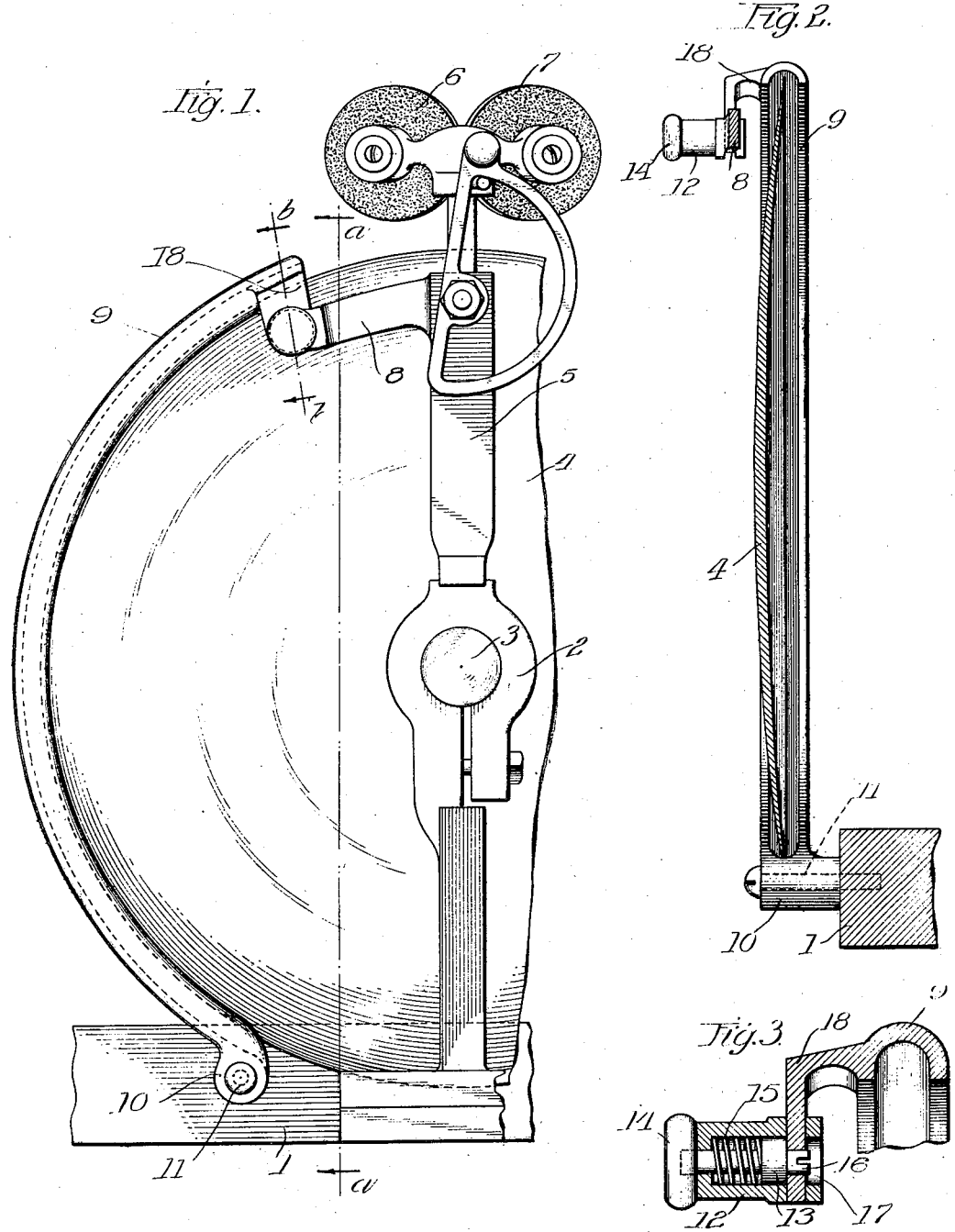

GEORGE J. SAYER, OF CHICAGO, ILLINOIS.

KNIFE-GUARD FOR ROTARY KNIVES.

1,124,962. Specification of Letters Patent. Patented Jan. 12, 1915.

Application filed October 13, 1913. Serial No. 795,007.

*To all whom it may concern:*

Be it known that I, GEORGE J. SAYER, a citizen of the United States, residing at Chicago, in the county of Cook and State of Illinois, have invented a certain new and useful Improvements in Knife-Guards for Rotary Knives, of which the following is a full, clear, concise, and exact description, reference being had to the accompanying drawings, forming a part of this specification.

My invention relates to knife guards for rotary knives and has for its object the provision of improved means for protecting the user of the rotary knife from accidentally coming into contact with the blade, which means are so arranged that they are readily attachable and detachable from the machine, and are also so arranged that they can be swung out of their normal position to permit cleaning not only of the means but also of the knife, which cleaning is necessary on account of the nature of the use to which the device is put. The rotary knives for meat cutting machines, for instance, carry with them portions of fat or other similar material and thus tend to clog up a guard in a manner to detract from the usefulness of the machine.

I will explain one form of carrying out my invention by referring to the accompanying drawing, in which—

Figure 1 is a fragmentary view of a rotary knife machine provided with my improved guard; Fig. 2 is a sectional view on line *a—a* of Fig. 1; and Fig. 3 is a sectional view on line *b—b* of Fig. 1.

In the drawing I show a machine framework consisting of the base 1 which has a suitable bearing 2 to support a shaft 3 carrying a rotary knife blade 4. The rotary blade of course is to be suitably rotated for meat cutting purposes by any suitable devices not shown herein as is well understood. A post 5 is mounted upon the bearing 2 and fastened thereto, and carries suitable sharpening appliances consisting of the sharpeners 6 and 7, which however do not form part of this invention, the post 5 however serving through the agency of an arm 8 to support one extremity of my improved guard 9. This guard as will be seen consists of a grooved metal strip arranged in the form of an arc having at its lower extremity a bearing portion 10 by means of which it is pivoted upon a shaft 11 suitably held upon the frame 1 of the machine. This guard of course protects the user of the machine against coming into contact with that side of the rotary knife otherwise exposed which is not being utilized for meat cutting purposes. The arm 8 carries a socket 12, which socket has a plunger 13 controlled by a fingerpiece 14 and pressed to the right (Fig. 3) by the spring 15. This plunger has a stud 16 which is adapted to enter an aperture 17 provided in an arm 18 extending from the guard 9. The arm 8 has, as is apparent, a bifurcated extremity to receive the arm 18. Now in order to clean the guard and also the knife, all that is necessary to do is to pull the plunger 13 to the left (Fig. 3), thereby withdrawing the stud 16 from the aperture within the arm 18, whereupon the guard 9 may be swung in a contra-clockwise direction (Fig. 1) about the shaft 11, thus to expose the knife and to render the interior grooved portion of the guard 9 accessible for cleaning purposes.

It will thus be seen that a suitable guard is provided which prevents contact with the exposed portion of the knife and which at the same time can be readily displaced without removal for cleaning purposes. It will thus be seen that no time need be wasted in cleaning the machine and this is of course quite important in machines of this kind where the machine must be ready for use when needed.

I have thus described one form which my invention may take, but it is of course readily apparent that changes and modifications may be made without departing from its spirit.

Having however thus described one form of carrying out my invention, what I claim as new and desire to secure by Letters Patent is:

1. In a meat slicing machine the combination with a rotary knife, a bed plate, a bracket extending from said bed plate carrying a bearing for said knife, a grooved knife guard for that portion of the knife opposite the portion where the actual cutting is effected, pivotally mounted to said bed plate at the lower extremity of said guard, an arm surmounting said bearing, and means carried by said arm for detachably holding the upper extremity of said knife guard in position to confine the edge of the knife between the opposite outer sides of said guard.

2. In a meat slicing machine the combination with a rotary knife, a bed plate, a bracket extending from said bed plate carrying a bearing for said knife, a grooved knife guard for that portion of the knife opposite the portion where the actual cutting is effected pivotally mounted to said bed plate at the lower extremity of said guard, an arm surmounting said bearing, and a spring catch carried by said arm for detachably holding the upper extremity of said knife guard in position to confine the edge of the knife between the opposite outer sides of said guard.

In witness whereof, I hereunto subscribe my name this twenty fifth day of September, A. D. 1913.

GEORGE J. SAYER

Witnesses:
   WM. A. CHAPIN,
   GUSTAV REICHARDS.